United States Patent Office 3,672,755
Patented June 27, 1972

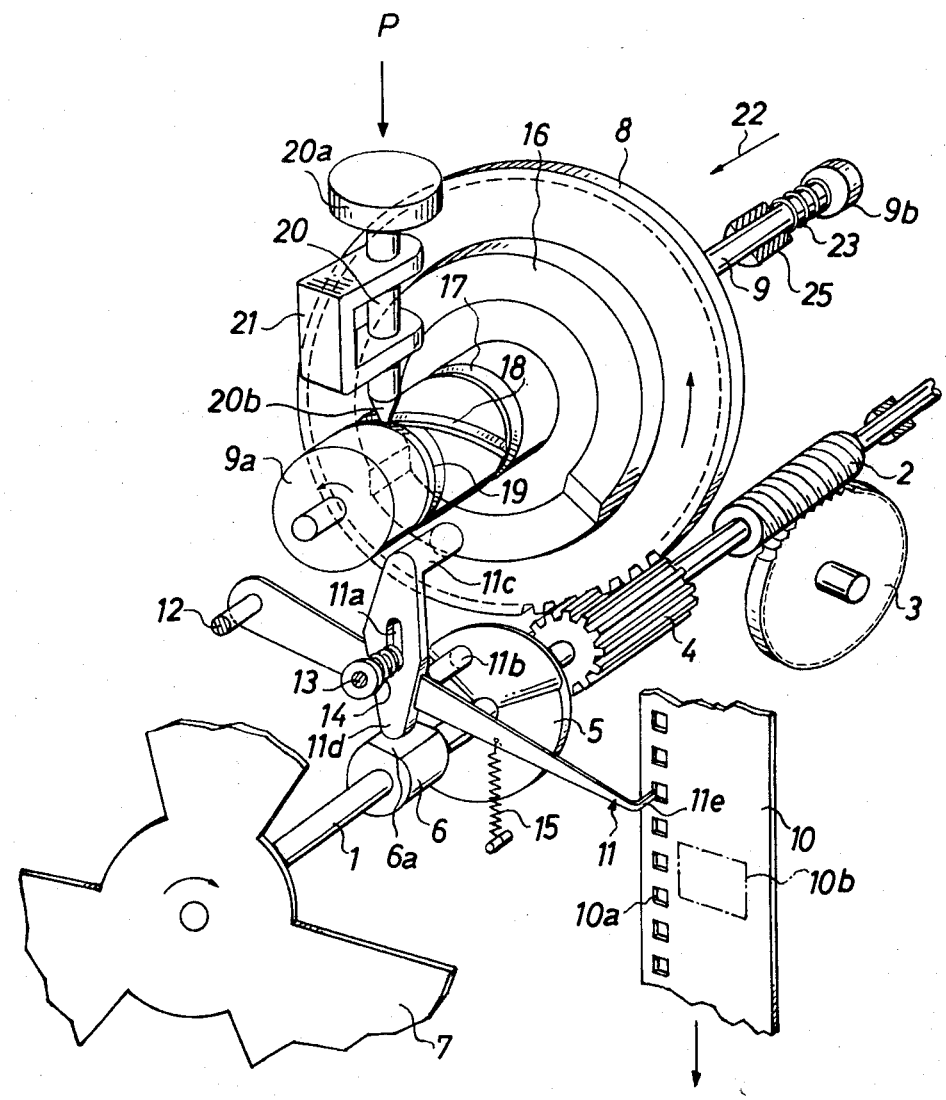

3,672,755
CINEMATOGRAPHIC APPARATUS
Heldemar Radl, Munich, Germany, assignor to Agfa-Gevaert Aktiengesellschaft, Leverkusen, Germany
Filed Dec. 8, 1970, Ser. No. 96,062
Claims priority, application Germany, Dec. 13, 1969,
G 69 48 290.2
Int. Cl. G03b 1/22
U.S. Cl. 352—194                     10 Claims

ABSTRACT OF THE DISCLOSURE

The film transporting mechanism of a motion picture projector has two rotary in-out cams the first of which moves the claw of the pull-down into and out of perforations of motion picture film at a normal frequency and the second of which can be shifted axially to an operative position so as to override the first cam during certain stages of each revolution to thus reduce the frequency of film transport. The shifting device for the second cam consists of a helical groove machined into a cylindrical extension of the second cam and a wiper which can be moved by hand to enter the groove. The second cam is driven by a gear train which receives torque from the shaft for the first cam. The shaft further rotates a shutter and a transporting cam which moves the pull-down in and counter to the direction of film transport.

BACKGROUND OF THE INVENTION

The present invention relates to cinematographic apparatus in general, and more particularly to improvements in film transporting mechanisms for use in motion picture projectors. Still more particularly, the invention relates to improvements in transporting mechanisms which are designed to advance motion picture film at several frequencies while the rotational speed of the shutter remains unchanged.

SUMMARY OF THE INVENTION

An object of the invention is to provide a simple, compact, rugged and inexpensive film transporting mechanism which can be incorporated in presently known motion picture projectors to transport the film at several frequencies.

Another object of the invention is to provide a film transporting mechanism which can change the frequency of film transport or interrupt the transport of motion picture film in a projector whenever the operator so desires and for any desired interval of time.

A further object of the invention is to provide the film transporting mechanism with a novel combination of in-out cams for the pull-down.

An additional object of the invention is to provide a film transporting mechanism which is particularly suited to transport motion picture film at normal frequency and with slow-motion effect.

The invention is embodied in a cinematographic apparatus wherein the film transporting mechanism comprises a rotary shaft which is preferably driven at a constant speed and is rigid with a rotary shutter, a pull-down having a claw which can enter the perforations of motion picture film to transport the film lengthwise while received in a perforation, a first in-out cam which is preferably rigid with the shaft, a first follower provided on or operatively connected with the pull-down to normally track the in-out cam and to thereby move the claw into and out of perforations at a time frequency, a second in-out cam which is preferably rotatable about an axis parallel to the axis of the shaft, a transmission for rotating the second cam in response to rotation of the first cam, the second cam being movable axially to and from an operative position, shifting means for moving the second cam to its operative position at the will of the operator, and a second follower operatively connected with the pull-down and tracking the second cam in the operative position of the second cam to thereby disengage the first follower from the first cam at least during a portion of each revolution of the first cam and to thus change the frequency at which the claw is being moved into and out of perforations to a second frequency, for example, to a frequency which produces a slow-motion effect.

The shifting means preferably comprises a cylindrical extension provided on the second cam and having two circumferentially complete annular grooves and a helical groove whose ends communicate with the annular grooves, and a wiper which is movable by hand and extends into one annular groove in an idle position of the second cam, into the helical groove during movement of the second cam toward its operative position, and into the other annular groove in the operative position of the second cam. A spring is preferably provided to permanently bias the second cam away from its operative position.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single figure is a perspective view of a mechanism which is used in a motion picture projector to transport the film at several frequencies.

DESCRIPTION OF THE PREFERRED EMBODIMENTS

The drawing shows a transporting mechanism which is incorporated in a projector for motion picture film 10. The film 10 has a row of perforations 10a and is advanced stepwise so as to place successive frames 10b (only one shown) into registry with the projection lens (not shown).

The film transporting mechanism comprises a shaft 1 which drives a rotary shutter 7, a relatively long spur gear 4, a first in-out cam in the form of a face cam or axial cam 5, and a radially acting transporting cam 6 having a flat 6a. The drive for the shaft 1 comprises a worm 2 on the shaft 1 and a worm wheel 3 which is driven by an electric motor or another suitable prime mover, not shown. It is assumed that the shaft 1 is driven at a constant speed. The gear 4 forms part of a transmission in the form of a gear train which further includes a larger spur gear 8 meshing wtih the gear 4 and rotatable about the axis of a second shaft 9 which is parallel to the shaft 1. The rotational speed of the gear 8 is considerably less than the rotational speed of the gear 4. For example, the ratio of the transmission 4, 8 may be three-to-one.

The shaft 9 is reciprocable axially between an operative position and an idle position which is shown in the drawing. A helical return spring 23 reacts against a stationary bearing sleeve 25 and bears against a head 9b of the shaft 9 to permanently urge the shaft 9 to the illustrated idle position. The shaft 9 is rigidly connected to or integral with a relatively large second in-out cam in the form of an axial cam or face cam 16 which is movable with the shaft 9 between the aforementioned idle and operative positions. In order to assume its operative position, the in-out cam 16 must be shifted axially in the direction indicated by arrow 22 by overcoming the resistance of the return spring 23. The shifting means for moving the cam 16 to its operative position comprises a manually depressible member 20 having a knob 20a and a conical wiper or tip 20b. The shifting means further comprises a cylindrical extension 9a of the in-out cam 16. The periphery of the extension 9a is provided with two axially spaced circumferentially complete annular grooves 17, 19 and a helical groove 18 whose ends communicate with the grooves 17, 19. The member 20 is reciprocable in a U-shaped support 21 which is mounted in or forms part of the housing of the motion picture projector. The direction in which the member 20 can be moved axially in response to application of finger pressure is indicated by the arrow P.

The film transporting mechanism further comprises a pull-down 11 having a claw 11e which is movable into and from the adjacent perforation 10a under the action of the in-out cam 5 and which is also movable lengthwise of the film 10 by the transporting cam 6. The pull-down 11 is rockable on a fixedly mounted pivot pin 12 and comprises a first follower 11b which normally tracks the front end face of the in-out cam 5 under the action of a helical spring 14. A second helical spring 15 biases a second follower 11d of the pull-down 11 against the transporting cam 6. A third follower 11c of the pull-down can reach the front end face of the in-out cam 16 when the latter is moved to its operative position. The spring 14 is convoluted around a stationary guide pin 13 which extends through a slot 11a in an enlarged median portion of the pull-down 11. The cam 5 or 16 can move the claw 11a in or out of the adjacent perforation 10a, and the cam 6 can move the claw 11 in the longitudinal direction of the row of perforations 10a.

When the in-out cam 16 is held in the inoperative position, the tip 20b of the member 20 extends into or is in registry with the annular groove 19 and the claw 11a moves into and from perforations 10a at the normal frequency which is determined by the configuration of the front face of the in-out cam 5. The arrangement is such that the claw 11a performs a working stroke (cam 6) after it enters the adjoining perforation 10a (cam 5) to thereby transport the film 10 lengthwise by a step, that the claw 11a thereupon moves out of the adjoining perforation (cam 5) and moves backwards (cam 6) to move into registry with the next-following perforation 10a, and so on.

If the shaft 1 completes six revolutions per unit of time and the face of the cam 5 is such that it moves the claw 11a three times during each revolution of the shaft 1, the film 10 is transported at a frequency of 18 steps per unit of time. If the transmission ratio of the gear train 4, 8 is three-to-one, the cam 16 is rotated at two revolutions per unit of time. If the face of the cam 16 is such that it holds the follower 11b of the pull-down 11 away from 240 degrees during each revolution of the shaft 1, the frequency at which the film 10 is transported is reduced to six steps per unit of time as soon as the shifting device 9a, 20 causes the cam 16 to assume its operative position. The cam 16 then overrides the cam 5 during a certain stage of each revolution of the shaft 1. Thus, when the cam 16 is moved to its operative position, the follower 11b tracks the cam 5 during a first stage and the follower 11c tracks the cam 16 during the remaining stage of each revolution of the shaft 1. Referring again to the aforementioned example, the normal frequency at which the claw 11a enters into and leaves the perforations 10a is reduced to one third when the cam 16 moves to its operative position.

When the operator wishes to produce a special effect, i.e., to reduce the apparent speed of objects in motion, the knob 20a is depressed in the direction indicated by the arrow P so that the tip 20b of the member 20 is caused to leave the groove 19 and to enter the helical groove 18. This causes the shaft 9, the cam 16 and the extension 9a to move axially (arrow 22) against the opposition of the spring 23 whereby the cam 16 reaches its operative position when the tip 20b enters the annular groove 17. In order to enable the pull-down 11 to transport the film 10 at the normal frequency, the user simply withdraws the tip 20b from the groove 17 whereby the spring 23 expands and returns the cam 16 to the illustrated idle position.

The rotary movement of the shutter 7 is synchronized with movements of the pull-down 11 by appropriate selection of the configuration of helical groove 18 and cams 5, 6 and 16. Since the gears 4 and 8 are in permanent mesh with each other, the overriding action of the cam 16 is reproducible with utmost accuracy irrespective of the timing of actuation of the shifting member 20. The gears 4, 8 can be replaced by differently dimensioned gears to change the transmission ratio between the shafts 1 and 9 and to thus select a desired frequency for the transport of film 10. Furthermore, the in-out cam 16 can be replaced with a simple disk having a flat front surface which, when engaged and tracked by the follower 11c, holds the claw 11e against entry into the perforations 10a as long as the tip 20b of the shifting member 20 extends into the groove 17. This enables the operator to project the image of a particular frame for any desired period of time.

Without further analysis, the foregoing will be fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus, a rotary shaft; a pull-down having a claw arranged to enter the perforations of motion picture film and to move the film lengthwise along a predetermined path while received in a perforation; transporting means operative to move said claw lengthwise of said path while the claw extends into a perforation; a first in-out cam on said shaft; a first follower provided on said pull-down to track said cam and to thereby move said claw into and out of perforations at a first frequency; a second in-out cam; a transmission for rotating said second cam in response to rotation of said first cam, said second cam being movable axially between operative and idle positions; a first shifting member sharing axial movements of said second cam; a second shifting member movable into engagement with said first shifting member, one of said members having a helical groove and the other member having a wiper extendable into said groove to thereby move the second cam to said operative position; and a second follower operatively connected with said pull-down and tracking said second cam in said operative position to thereby disengage said first follower from said first cam at least during a portion of each revolution of said first cam to thus change said first frequency to a second frequency.

2. A structure as defined in claim 1, further comprising a shutter fixed to said shaft, said one shifting member being said first shifting member and further having two annular grooves each communicating with one end of said helical groove, said wiper being receivable in one of said annular grooves in the operative position and in the other annular groove in the idle position of said second cam.

3. A structure as defined in claim 1, wherein said second follower is rigid with said pull-down.

4. A structure as defined in claim 1, wherein said transmission comprises a gear train.

5. A structure as defined in claim 4, wherein said gear train comprises a first spur gear fixed to said shaft and a second spur gear meshing with said first spur gear and arranged to transmit torque to said second cam.

6. A structure as defined in claim 4, wherein said gear train includes a gear which is integral with said second cam.

7. A structure as defined in claim 1, further comprising means for biasing said second cam to one of said positions.

8. A structure as defined in claim 1, wherein said in-out cams are face cams rotatable about parallel axes.

9. A structure as defined in claim 8, wherein said first shifting member is coaxial with and constitutes an integral cylindrical extension of said second face cam.

10. A structure as defined in claim 1, further comprising drive means for rotating said shaft at a first speed, said transmission being arranged to rotate said second cam at a lower second speed.

References Cited
UNITED STATES PATENTS

| | | | |
|---|---|---|---|
| 2,173,230 | 9/1939 | Kellogg | 352—194 X |
| 3,584,774 | 6/1971 | Kadowaki | 352—194 X |

SAMUEL S. MATTHEWS, Primary Examiner

R. P. GREINER, Assistant Examiner

U.S. Cl. X.R.

352—180, 191; 226—62